United States Patent
Holla et al.

(10) Patent No.: US 12,542,044 B2
(45) Date of Patent: Feb. 3, 2026

(54) METHODS FOR IMPROVING GUARD SAFETY IN A CORRECTIONAL FACILITY USING A VIDEO SURVEILLANCE SYSTEM

(71) Applicant: Honeywell International Inc., Charlotte, NC (US)

(72) Inventors: Chaithanya Holla, Bangalore (IN); Lalitha M. Eswara, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 15 days.

(21) Appl. No.: 18/403,703

(22) Filed: Jan. 3, 2024

(65) Prior Publication Data
US 2025/0218273 A1    Jul. 3, 2025

(51) Int. Cl.
| | |
|---|---|
| G08B 21/18 | (2006.01) |
| G06V 20/52 | (2022.01) |
| G06V 40/16 | (2022.01) |
| G08B 3/10 | (2006.01) |
| H04N 7/18 | (2006.01) |

(52) U.S. Cl.
CPC ........... *G08B 21/182* (2013.01); *G06V 20/52* (2022.01); *G06V 40/172* (2022.01); *G08B 3/10* (2013.01); *H04N 7/181* (2013.01)

(58) Field of Classification Search
CPC ........ G08B 21/182; G08B 3/10; G06V 20/52; G06V 40/172; H04N 7/181
USPC ........................................................ 340/540
See application file for complete search history.

(56) References Cited

U.S. PATENT DOCUMENTS

| | | | |
|---|---|---|---|
| 6,489,893 B1 * | 12/2002 | Richards ................. | G01S 13/76 340/573.4 |
| 8,068,676 B2 * | 11/2011 | Zhang ................ | G06Q 30/0631 705/26.7 |
| 8,983,129 B2 | 3/2015 | Rexilius et al. | |
| 2007/0285504 A1 * | 12/2007 | Hesse ...................... | H04N 7/15 348/E7.083 |
| 2009/0265106 A1 * | 10/2009 | Bearman .................. | G06N 5/02 701/300 |
| 2010/0176918 A1 * | 7/2010 | Turner ..................... | G07C 9/28 340/5.61 |

(Continued)

FOREIGN PATENT DOCUMENTS

CN    107392169 A    11/2017

OTHER PUBLICATIONS

IBM Intelligent Video Analytics V3.0 5725-H94, IBM Europe Sales Manual, 8 pages, Revised Apr. 14, 2020.

*Primary Examiner* — Zhen Y Wu
(74) *Attorney, Agent, or Firm* — Seager, Tufte & Wickhem, LLP

(57) ABSTRACT

Guard safety in a corrections facility may be improved by processing a video stream to identify guards that are present based at least in part on their apparel and to identify inmates that are present based at least in part on their apparel. A determination is made as to a number of guards that are present and a number of inmates that are present. A first alarm is issued when a ratio (R) of the number of guards that are present in the region of the corrections facility and the number of inmates that are present in the region of the corrections facility falls below a Guard Safety Ratio Threshold (GSRT). A second alarm may be issued when a separation distance between one or more of the inmates and a guard falls below a Guard Safety Spacing Threshold (GSST).

17 Claims, 9 Drawing Sheets

(56) References Cited

U.S. PATENT DOCUMENTS

| | | | | |
|---|---|---|---|---|
| 2011/0059688 | A1* | 3/2011 | Noonan | H04W 8/24 |
| | | | | 455/1 |
| 2013/0101165 | A1* | 4/2013 | Rexilius | G06V 40/10 |
| | | | | 382/103 |
| 2015/0358589 | A1* | 12/2015 | Passe | H04N 5/77 |
| | | | | 348/151 |
| 2017/0024986 | A1* | 1/2017 | Austin | H04N 5/772 |
| 2020/0327315 | A1* | 10/2020 | Mullins | G08B 13/19615 |
| 2021/0201269 | A1* | 7/2021 | Ainsworth | H04W 4/023 |
| 2021/0326546 | A1* | 10/2021 | Linn | G16H 40/20 |
| 2022/0051167 | A1* | 2/2022 | Johnson | G06Q 10/1097 |
| 2022/0343655 | A1* | 10/2022 | Shirol | G06V 10/765 |
| 2023/0276028 | A1* | 8/2023 | Dice | G06V 20/40 |
| | | | | 348/152 |

* cited by examiner

METHODS FOR IMPROVING GUARD SAFETY IN A CORRECTIONAL FACILITY USING A VIDEO SURVEILLANCE SYSTEM

TECHNICAL FIELD

The present disclosure relates generally to video surveillance systems and more particularly to using a video surveillance system in improving guard safety in a correctional facility.

BACKGROUND

The safety and security of the guards in a correctional facility are of utmost priority. During everyday operations, there may be numerous occasions in which the inmates are close to the guards. This can become a security threat to the guards, particularly if the inmates have malicious intentions. While correctional facilities employ video surveillance, there may be too many video streams for an operator to watch simultaneously. As a result, a possible dangerous situation may be recorded, the operator may not see it in real time. This may mean that the operator is not able to provide help in a timely manner. What would be desirable are methods in which the video surveillance system is able to perform video analytics on the video streams and detect possible situations that may become dangerous for one or more guards.

SUMMARY

The present disclosure relates generally to video surveillance systems and more particularly to using a video surveillance system in improving guard safety in a correctional facility. An example may be found in a method for improving guard safety in a corrections facility, wherein the corrections facility includes a video surveillance camera providing a video stream of a region of the corrections facility. The illustrative method includes processing the video stream via a video analytics engine to identify guards that are present in the region of the corrections facility based at least in part on their apparel and to identify inmates that are present in the region of the corrections facility based at least in part on their apparel. A determination is made as to a number of guards that are present in the region of the corrections facility and a number of inmates that are present in the region of the corrections facility. A first alarm is issued when a ratio (R) of the number of guards that are present in the region of the corrections facility and the number of inmates that are present in the region of the corrections facility falls below a Guard Safety Ratio Threshold (GSRT).

Another example may be found in a method for improving guard safety in a corrections facility, wherein the corrections facility includes a video surveillance camera providing a video stream of a region of the corrections facility. The illustrative method includes processing the video stream via a video analytics engine to identify guards and inmates that are present in the region of the corrections facility. A separation distance between each of the inmates to each of the guards that are identified as being present in the region of the corrections facility is determined. An alarm is issued when the separation distance between one or more of the inmates and a guard falls below a Guard Safety Spacing Threshold (GSST).

Another example may be found in a non-transitory computer readable medium storing instructions. When the instructions are executed by one or more processors, the one or more processors are caused to process a video stream of a region of a corrections facility using a video analytics engine to identify guards that are present in the region of the corrections facility and to identify inmates that are present in the region of the corrections facility. The one or more processors may be caused to determine a number of guards that are present in the region of the corrections facility and a number of inmates that are present in the region of the corrections facility, and issue a first alarm when a ratio (R) of the number of guards that are present in the region of the corrections facility and the number of inmates that are present in the region of the corrections facility falls below a Guard Safety Ratio Threshold (GSRT). The one or more processors may be caused to determine a separation distance between each of the inmates to each of the guards that are identified as being present in the region of the corrections facility, and issue a second alarm when the separation distance between one or more of the inmates and a guard falls below a Guard Safety Spacing Threshold (GSST).

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
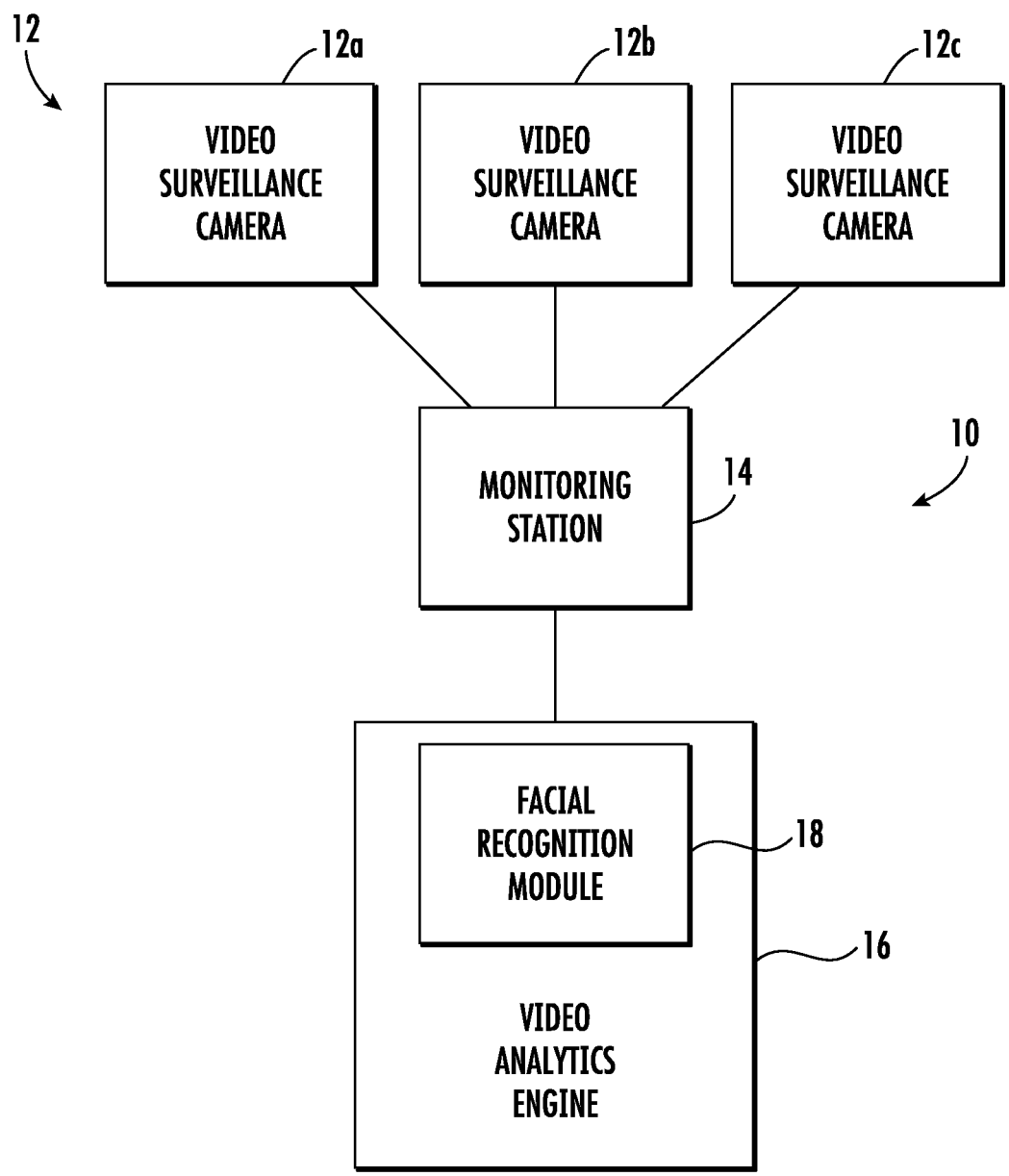
FIG. 1 is a schematic block diagram showing an illustrative video surveillance system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative video surveillance system 10. The illustrative video surveillance system 10 may be deployed in any of a variety of different facilities. In some instances, the video surveillance system 10 may be deployed in a correctional facility such as a prison or a jail, and will be described as that example. The video surveillance system 10 includes a number of video surveillance cameras 12, individually labeled as 12a, 12b and 12c. While a total of three video surveillance cameras 12 are shown, this is merely illustrative, as the video surveillance system 10 may include a single video surveillance camera 12, two video surveillance cameras 12, or four, five, six or more single video surveillance cameras 12. In some instances, the video surveillance system 10 may include considerably more than three video surveillance cameras 12. Each of the video surveillance cameras 12 may be in operative communication with a monitoring station 14, and may each provide one or more video streams to the monitoring station 14. In some instances, the monitoring station 14 may be coupled with a computer (not shown). In some instances, the monitoring station 14 may be manifested within a computer, for example.

The monitoring station 14 may be in communication with a video analytics engine 16 that is configured to execute any of a variety of different video analytics algorithms on any of the video streams that are captured by the video surveillance cameras 12. In some instances, the video analytics engine 16 may be manifested within a separate computer. In some instances, the video analytics engine 16 may be manifested within the monitoring station 14, such as within a computer serving as the monitoring station 14. In some instances, the video analytics engine 16 may be manifested within one or more of the video surveillance cameras 12. In some instances, each of the video surveillance cameras 12 may include a video analytics engine 16 for processing video captured by the corresponding video surveillance camera 12.

The video analytics engine 16 may include any number of different video analytics modules. In some instances, the video analytics engine 16 may be configured to identify and classify whether a particular person is a guard or an inmate, for example, by ascertaining what the person is wearing. In some instances, the guards may wear a particular color or style of clothes while the inmates wear a different particular color or style of clothes. As an example, the guards may wear blue or black uniforms while the inmates may wear orange jumpsuits, or perhaps gray pants and shirts. These are just examples, and a variety of different wardrobe options may be contemplated. In some cases, the inmates may wear apparel that includes a visible image ID number, which can be read by the video analytics engine 16 and submitted to an inmate database to identify the particular inmate, including the particular inmate's past history, past behavior and/or past violence. These are just examples.

In some instances, the video analytics engine 16 may include a facial recognition module 18 to identify a particular inmate, including the particular inmate's past history, past behavior and/or past violence. In some instances, the facial recognition module 18 may identify a particular guard, including the particular guard's past history, past behavior and/or past interactions with inmates in the vicinity of the guard.

Figure 2:
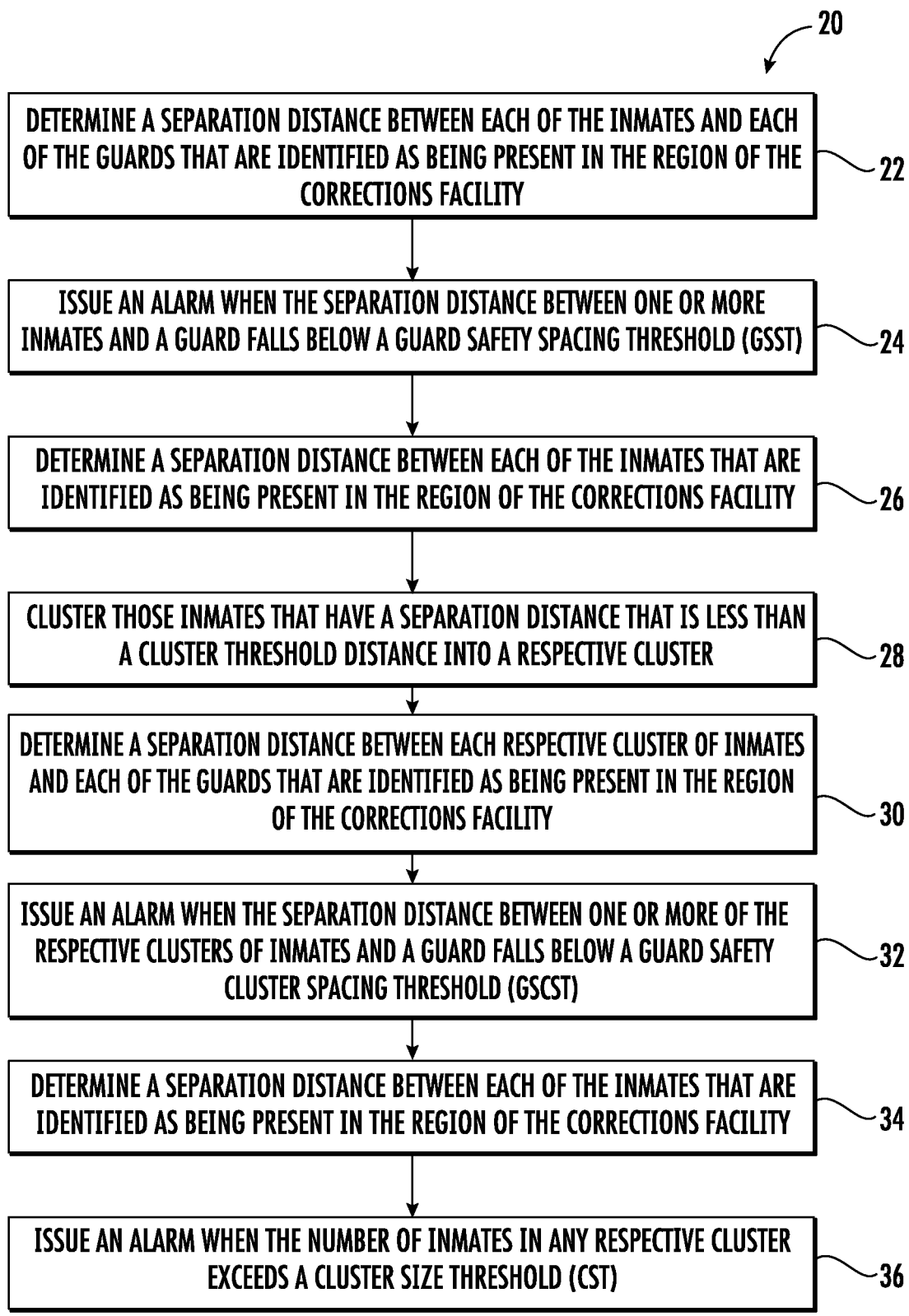
FIG. 2 is a flow diagram showing an illustrative series of steps that a video analytics engine forming part of the illustrative video surveillance system of FIG. 1 may be configured to carry out.

FIG. 2 is a flow diagram showing a series of steps 20 that the video analytics engine 16 may be configured to carry out. In some instances, the video analytics engine 16 may be configured determine a separation distance between each of the inmates to each of the guards that are identified as being present in the region of the corrections facility, as indicated at block 22. The video analytics engine 16 may be configured to issue an alarm when the separation distance between one or more inmates and a guard falls below a Guard Safety Spacing Threshold (GSST), as indicated at block 24.

The separation distance may be represented by a number of pixels between the each of the inmates and each of the guards. Depending on the distance that the inmates and/or guards are from the video surveillance cameras, the real world distance represented by each pixel may vary. For example, a pixel that corresponds to a region close to the video surveillance camera will represent a smaller real world distance than a pixel that corresponds to a region far from the video surveillance camera. A depth calibration may be performed that assigns to each of the pixels in the video frame a corresponding real world distance. Such a depth calibration may help increase the accuracy of the determined real world separation distance between the each of the inmates and each of the guards.

In some instances, the video analytics engine 16 may be configured to determine a separation distance between each of the inmates that are identified as being present in the region of the corrections facility, as indicated at block 26. The video analytics engine 16 may be configured to cluster those inmates that have a separation distance that is less than a cluster threshold distance into a respective cluster, as indicated at block 28. The video analytics engine 16 may be configured to determine a separation distance between each respective cluster of inmates and each of the guards that are identified as being present in the region of the corrections facility, as indicated at block 30. The video analytics engine 16 may be configured to issue an alarm when the separation distance between one or more of the respective clusters of inmates and a guard falls below a Guard Safety Cluster Spacing Threshold (GSCST), as indicated at block 32. The video analytics engine 16 may be configured to issue an alarm when the number of inmates in any respective cluster exceeds a Cluster Size Threshold (CST), as indicated at block 36.

Figure 3:
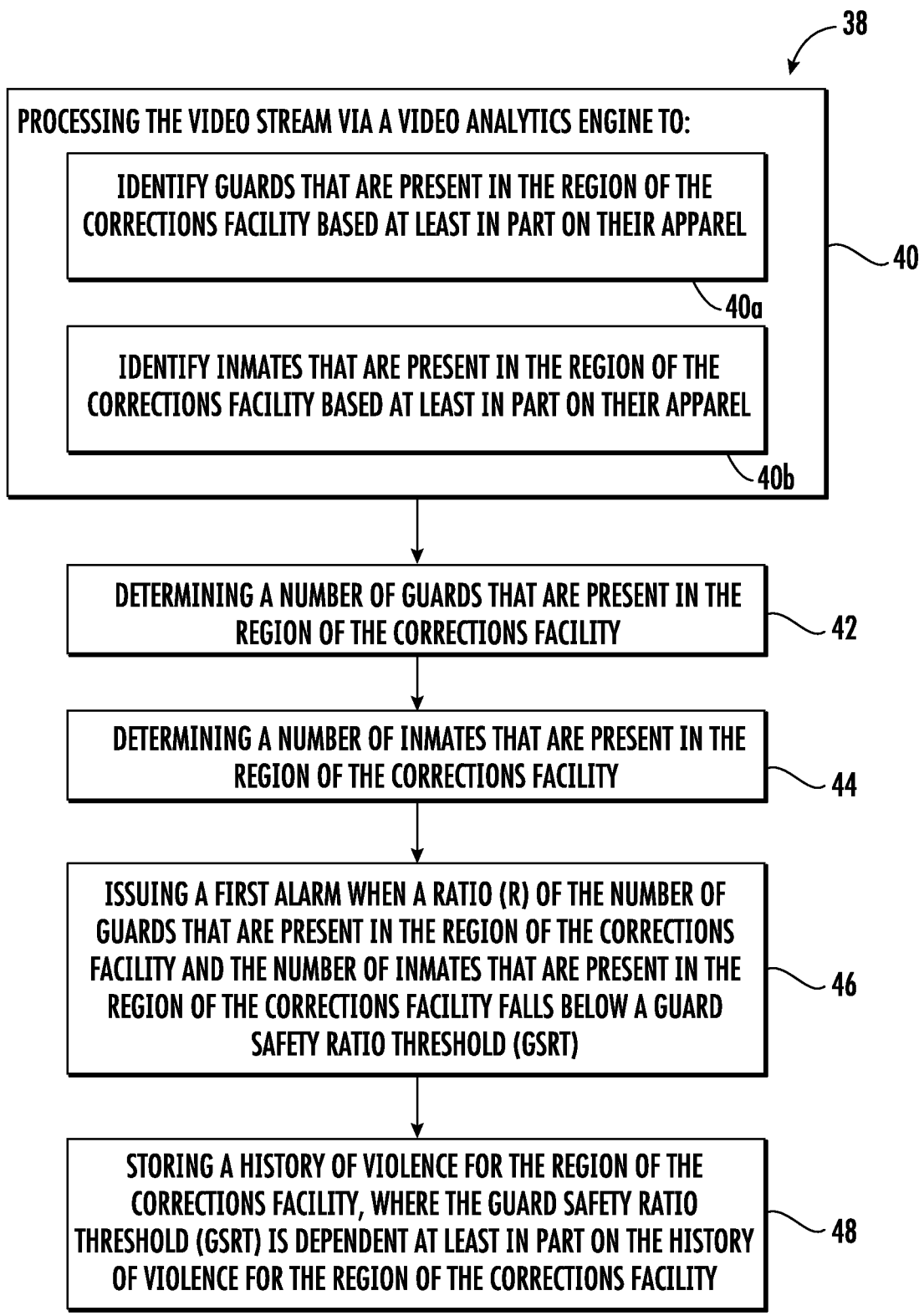
FIG. 3 is a flow diagram showing an illustrative method for improving guard safety in a corrections facility.

FIG. 3 is a flow diagram showing an illustrative method 38 for improving guard safety in a corrections facility, wherein the corrections facility includes a video surveillance camera (such as the video surveillance cameras 12) providing a video stream of a region of the corrections facility. The method 38 includes processing the video stream via a video analytics engine, as indicated at block 40. Processing the video stream includes identifying guards that are present in the region of the corrections facility based at least in part on their apparel, as indicated at block 40*a*. Processing the video stream includes identifying inmates that are present in the region of the corrections facility based at least in part on their apparel, as indicated at block 40*b*.

The illustrative method 38 includes determining a number of guards that are present in the region of the corrections facility, as indicated at block 42. A number of inmates that are present in the region of the corrections facility is determined, as indicated at block 44. A first alarm is issued when a ratio (R) of the number of guards that are present in the region of the corrections facility and the number of inmates that are present in the region of the corrections facility falls below a Guard Safety Ratio Threshold (GSRT), as indicated at block 46. In some instances, the Guard Safety Ratio Threshold (GSRT) may be dependent at least in part on the region of the corrections facility. As an example, some areas of the corrections facility may be deemed to generally be more dangerous while other areas may be deemed to be generally less dangerous. A remote area that is far from other guards may be deemed to generally be more dangerous because it may take considerable time for additional guards to reach that area. An area right next to the guard office may be deemed as generally less dangerous because a large number of guards are immediately available.

In some instances, the illustrative method 38 may further include storing a history of violence for the region of the corrections facility, where the Guard Safety Ratio Threshold (GSRT) is dependent at least in part on the history of violence for the region of the corrections facility, as indicated at block 48. In some instances, when the video analytics engine includes a facial recognition module that identifies particular inmates that are present in the region of the corrections facility, the Guard Safety Ratio Threshold (GSRT) may be dependent at least in part on the particular inmates that are identified as being present in the region of the corrections facility. The facial recognition module may identify particular guards that are present in the region of the corrections facility, and the Guard Safety Ratio Threshold (GSRT) may be dependent at least in part on the particular guards that are identified as being present in the region of the corrections facility.

Figure 4:
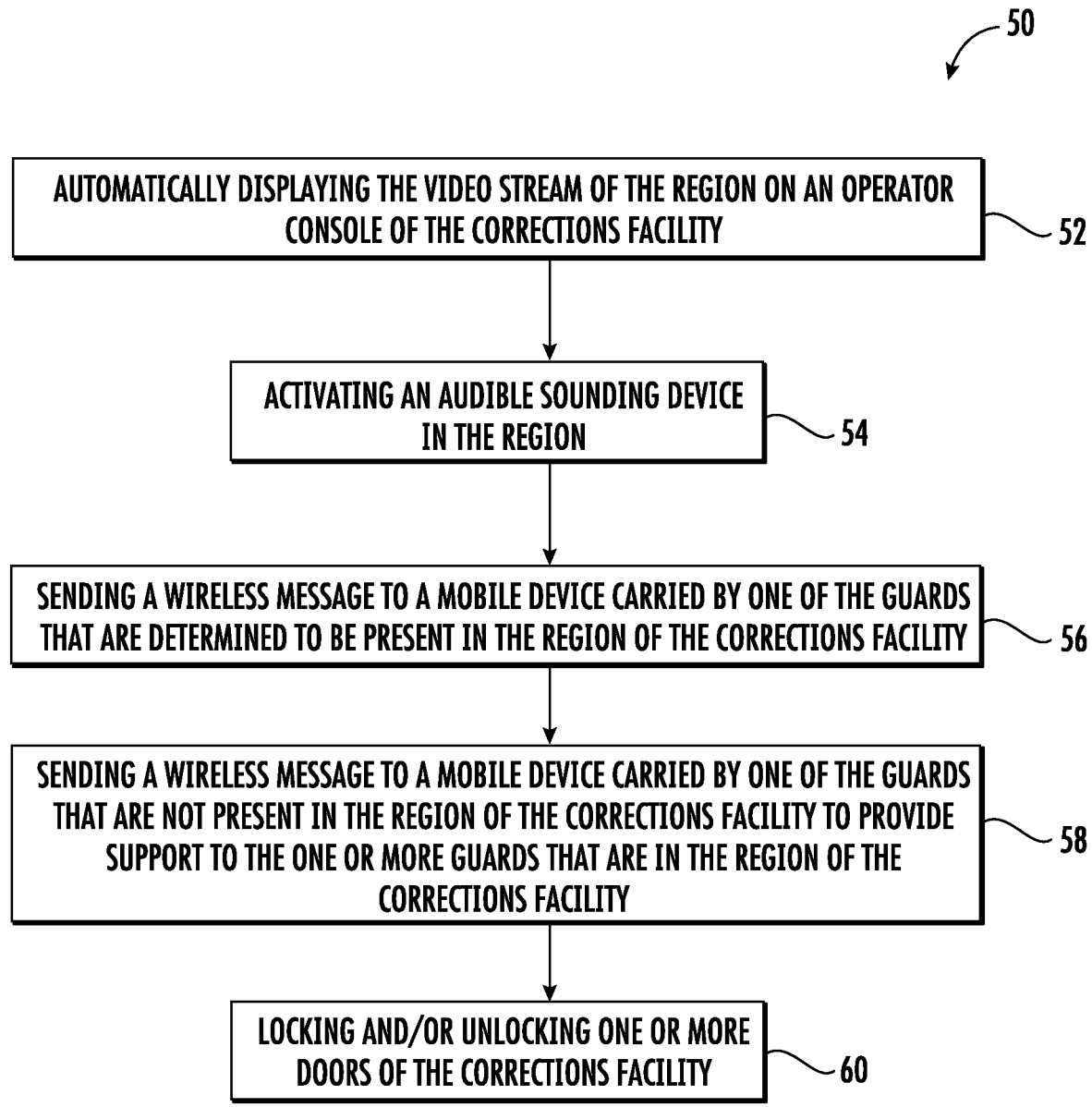
FIG. 4 is a flow diagram showing an illustrative series of alarms that may be issued by the illustrative video surveillance system of FIG. 1.

FIG. 4 is a flow diagram showing an illustrative series of alarms 50 that may be issued by the illustrative video surveillance system 10. In some instances, the series of alarms 50 may include automatically displaying the video stream of the region on an operator console of the corrections facility, as indicated at block 52. In some cases, nearby video streams may also be automatically displayed on the operator console when an alarm is issued. The series of alarms 50 may include activating an audible sounding device in the region, as indicated at block 54. The series of alarms 50 may include sending a wireless message to a mobile device carried by one of the guards that are determined to be present in the region of the corrections facility, as indicated at block 56. The series of alarms 50 may include sending a wireless message to a mobile device carried by one of the guards that are not present in the region of the corrections facility to provide support to the one or more guards that are in the region of the corrections facility, as indicated at block 58. The series of alarms 50 may include locking and/or unlocking one or more doors of the corrections facility, as indicated at block 60. One or more of these alarms may be issued, depending on the type of event detected.

Figure 5:
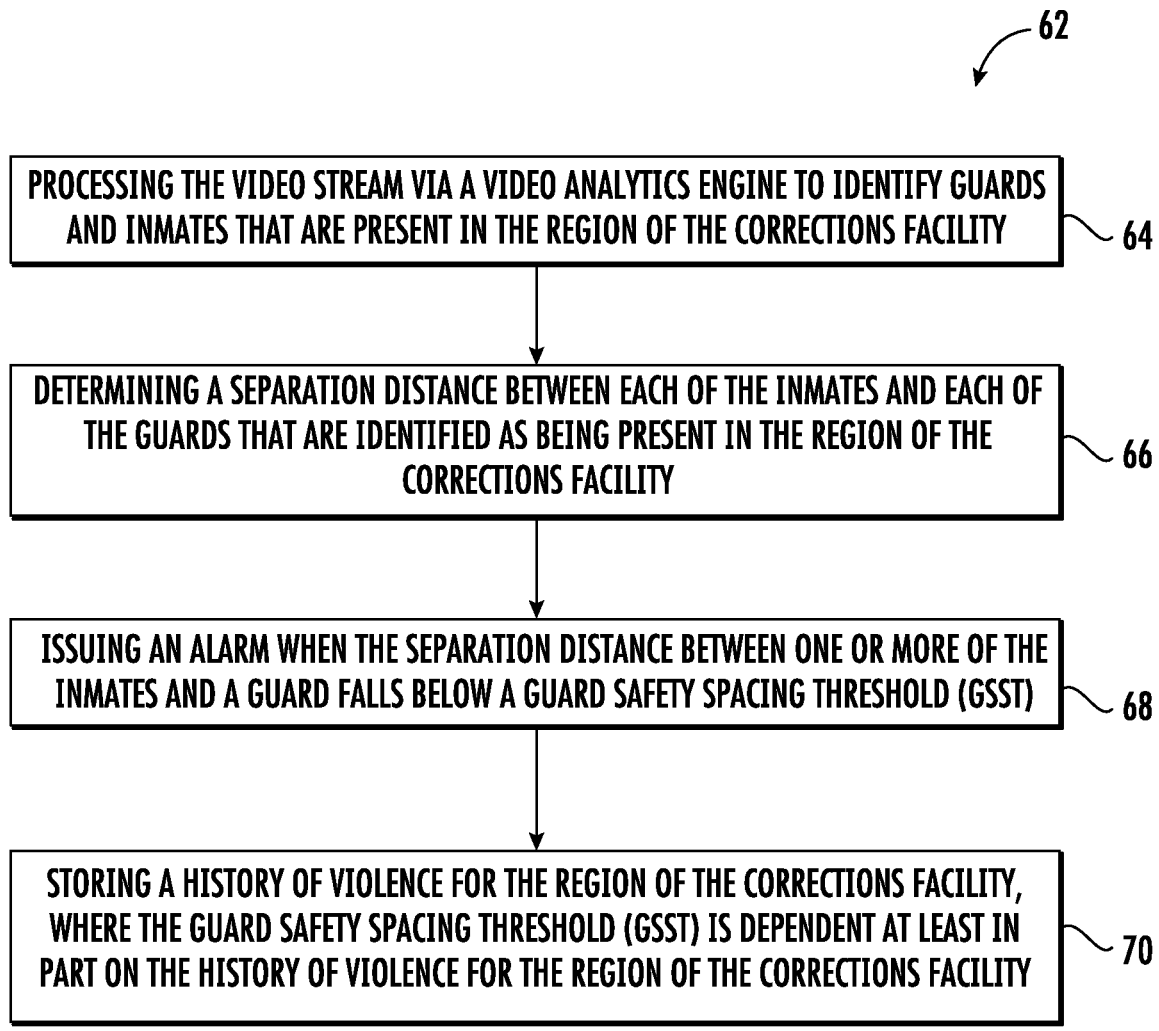
FIG. 5 is a flow diagram showing an illustrative method for improving guard safety in a corrections facility.

FIG. 5 is a flow diagram showing an illustrative method 62 for improving guard safety in a corrections facility, wherein the corrections facility includes a video surveillance camera providing a video stream of a region of the corrections facility. The illustrative method includes processing the video stream via a video analytics engine to identify guards and inmates that are present in the region of the corrections facility, as indicated at block 64. A separation distance between each of the inmates to each of the guards that are identified as being present in the region of the corrections facility is determined, as indicated at block 66. An alarm is issued when the separation distance between one or more of the inmates and a guard falls below a Guard Safety Spacing Threshold (GSST), as indicated at block 68. In some instances, the Guard Safety Spacing Threshold (GSST) may be dependent at least in part on the region of the corrections facility. In some instances, the method 62 may further include storing a history of violence for the region of the corrections facility, where the Guard Safety Spacing Threshold (GSST) may be dependent at least in part on the history of violence for the region of the corrections facility, as indicated at block 70.

In some instances, the video analytics engine may include a facial recognition module that identifies particular inmates that are present in the region of the corrections facility, and the Guard Safety Spacing Threshold (GSST) may be dependent at least in part on the particular inmates that are identified as being present in the region of the corrections facility. In some instances, the facial recognition module may identify particular guards that are present in the region of the corrections facility, and the Guard Safety Spacing Threshold (GSST) may be dependent at least in part on the particular guards that are identified as being present in the region of the corrections facility.

In some instances, the video analytics engine may be configured to determine a separation distance between each of the inmates that are identified as being present in the region of the corrections facility, cluster those inmates that have a separation distance between other inmates identified as being present in the region of the corrections facility that is less than a cluster threshold distance into a respective cluster, determine a separation distance between each respective cluster of inmates and each of the guards that are identified as being present in the region of the corrections facility, and issue a second alarm when the separation distance between one or more of the respective cluster of inmates and a guard falls below a Guard Safety Cluster Spacing Threshold (GSCST). In some instances, the video analytics engine may issue a third alarm when the number of inmates in any respective cluster exceeds a Cluster Size Threshold (CST).

Figure 6:
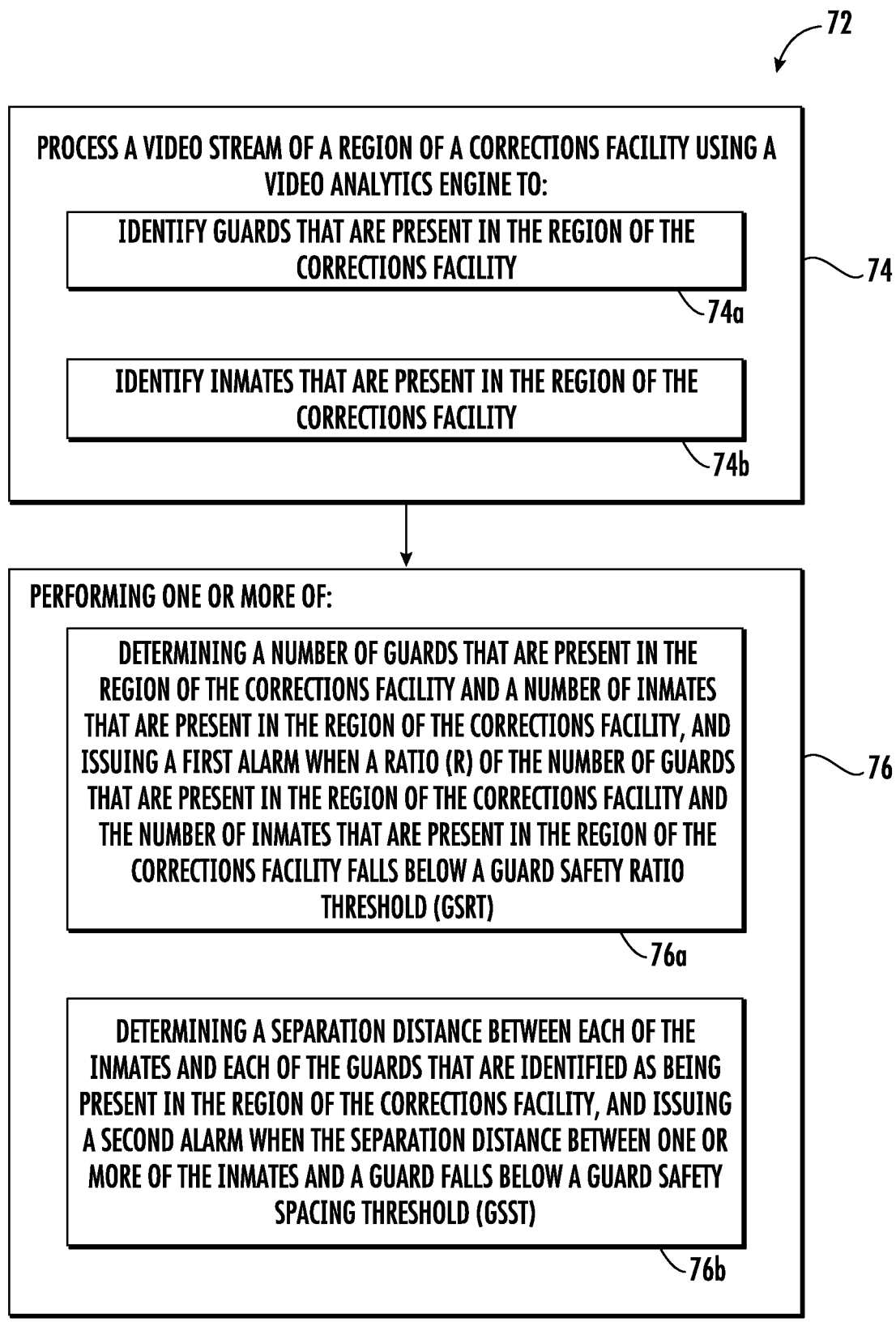
FIG. 6 is a flow diagram showing an illustrative series of steps that may be carried out by one or more processors executing executable instructions.

FIG. 6 is a flow diagram showing a series of steps 72 that may be carried out by one or more processors when the one or more processors execute executable instructions that are stored on a storage medium. The one or more processors may be part of the monitoring station 14, perhaps, or part of the video analytics engine 16. The one or more processors are caused to process a video stream of a region of a corrections facility using a video analytics engine, as indicated at block 74. The one or more processors are caused to identify guards that are present in the region of the corrections facility, as indicated at block 74a. The one or more processors are caused to identify inmates that are present in the region of the corrections facility, as indicated at block 74b.

The one or more processors are caused to perform one or more steps, as indicated at block 76. The one or more processors may be caused to determine a number of guards that are present in the region of the corrections facility and a number of inmates that are present in the region of the corrections facility, and to issue a first alarm when a ratio (R) of the number of guards that are present in the region of the corrections facility and the number of inmates that are present in the region of the corrections facility falls below a Guard Safety Ratio Threshold (GSRT), as indicated at block 76a. The one or more processors may be caused to determine a separation distance between each of the inmates and each of the guards that are identified as being present in the region of the corrections facility, and to issue a second alarm when the separation distance between one or more of the inmates and a guard falls below a Guard Safety Spacing Threshold (GSST), as indicated at block 76b.

In some instances, one or more of the Guard Safety Ratio Threshold (GSRT) and the Guard Safety Spacing Threshold (GSST) may be dependent at least in part on one or more of the region of the corrections facility, a history of one or more of the Guard Safety Ratio Threshold (GSRT) and the Guard Safety Spacing Threshold (GSST) for the region of the corrections facility, whether a weapon is currently identified by the video analytics engine in the region of the corrections facility, and/or a history of violence for the region of the corrections facility. In some instances, the one or more processors are caused to use facial recognition to identify particular inmates and/or particular guards that are present in the region of the corrections facility, where one or more of the Guard Safety Ratio Threshold (GSRT) and the Guard Safety Spacing Threshold (GSST) may be dependent at least in part on the particular inmates and/or particular guards that are identified as being present in the region of the corrections facility.

In some instances, the first alarm and/or the second alarm may include one or more of automatically displaying the video stream of the region on an operator console of the corrections facility, activating an audible sounding device in the region, sending a wireless message to a mobile device carried by one of the guards that are determined to be present in the region of the corrections facility, sending a wireless message to a mobile device carried by one of the guards that are not present in the region of the corrections facility to provide support to the one or more guards that are in the region of the corrections facility, and/or locking and/or unlocking one or more doors of the corrections facility. These are just examples.

Figure 7:
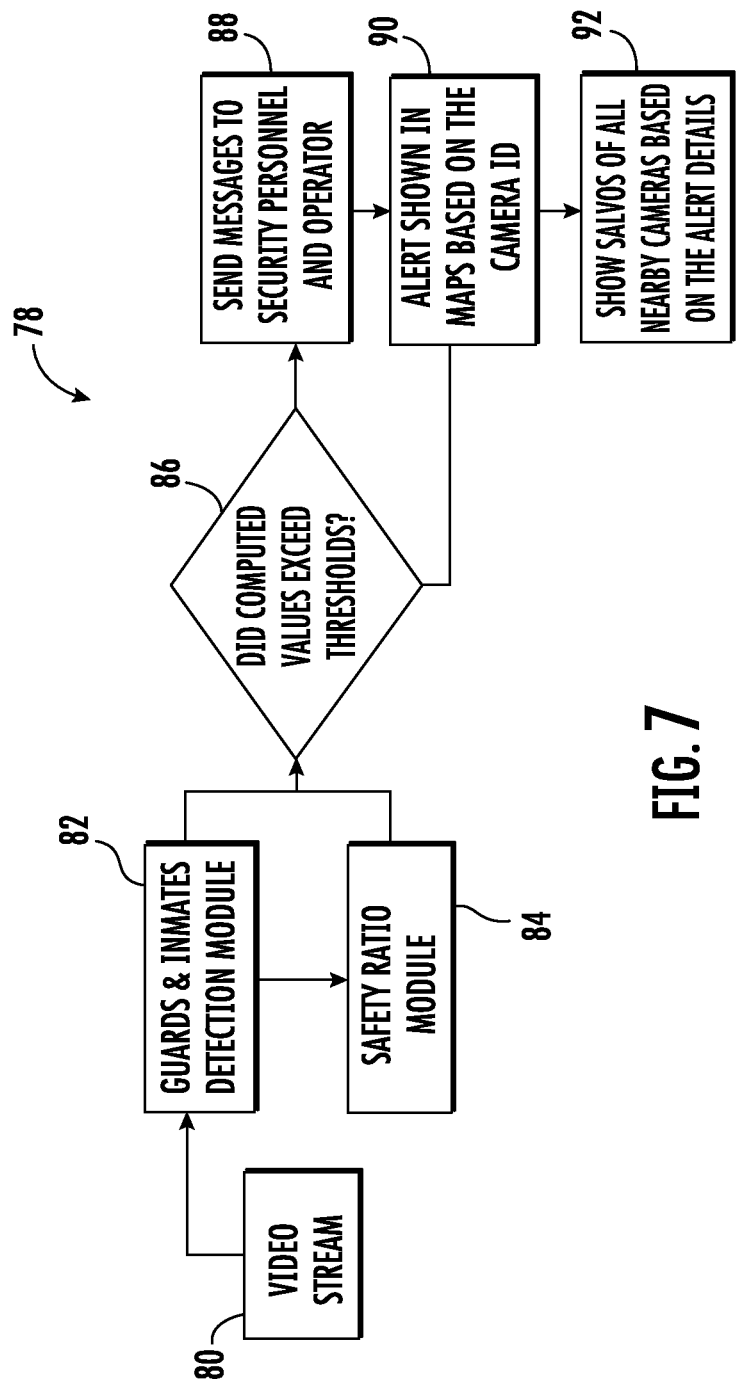
FIG. 7 is a flow diagram showing an illustrative method.

FIG. 7 is a flow diagram showing an illustrative method 78. A video stream 80 passes to a Guards and Inmates detection module 82 (shown in more detail in FIG. 8). A Safety Ratio module 84 (shown in more detail in FIG. 9) communicates back and forth with the Guards and Inmates detection module 82. At a decision block 86, a determination is made as to whether the outputs from the Guards and Inmates detection module 82 and the Safety Ratio module 84 (these outputs are combined or summed) exceed a threshold. If so, control passes to a block 88, where messages are sent to security personnel. Control also passes to block 90, where an alert is raised. Control also passes to block 92, where the relevant video streams are displayed.

Figure 8:
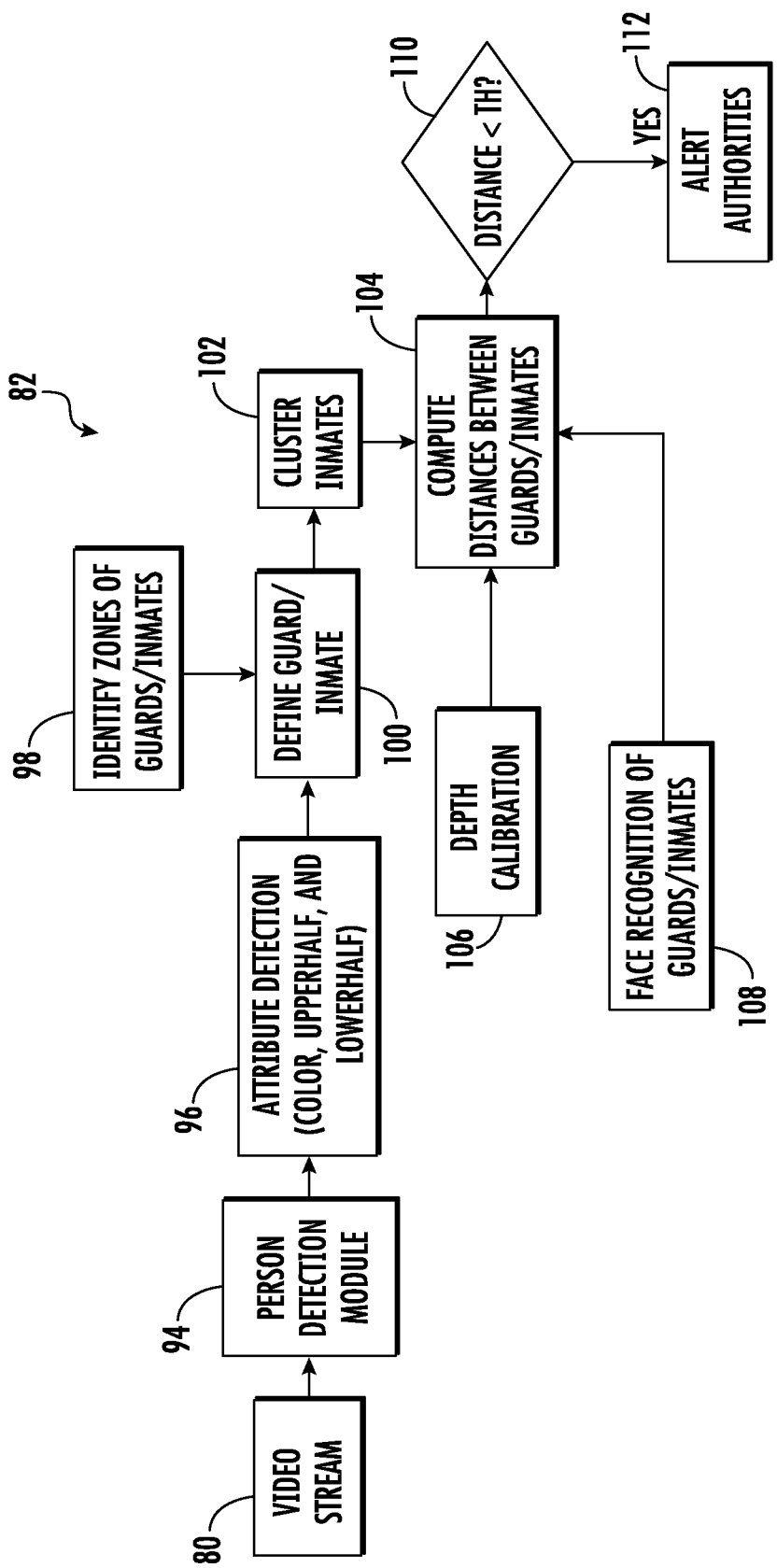
FIG. 8 is a flow diagram showing further details of the Guards and Inmates Detection Module used in the method of FIG. 7.

FIG. 8 is a flow diagram showing more details regarding the Guards and Inmates detection module 82. The video stream 80 passes to a Person Detection module 94, which detects guards and inmates by their apparel or uniform. Because some regions utilize different apparel or uniforms, it may be necessary to separately identify the upper half (shirts) and lower half (pants) of what each person is wearing, as indicated at block 96. This may include processing images for color attributes and design. Zones of guards and inmates are identified, as indicated at block 98. This information is provided to block 100, where guards and inmates are identified, including identification based on information from block 96. The inmates are clustered, as indicated at block 102. At block 104, the distances between guards and inmates are calculated. This may include calibration information from a depth calibration block 106 and/or a facial recognition block 108. At a decision block 110, a determination is made as to whether the distances between guards and inmates are less than a threshold value. If so, control passes to block 112 and the authorities are alerted.

Figure 9:
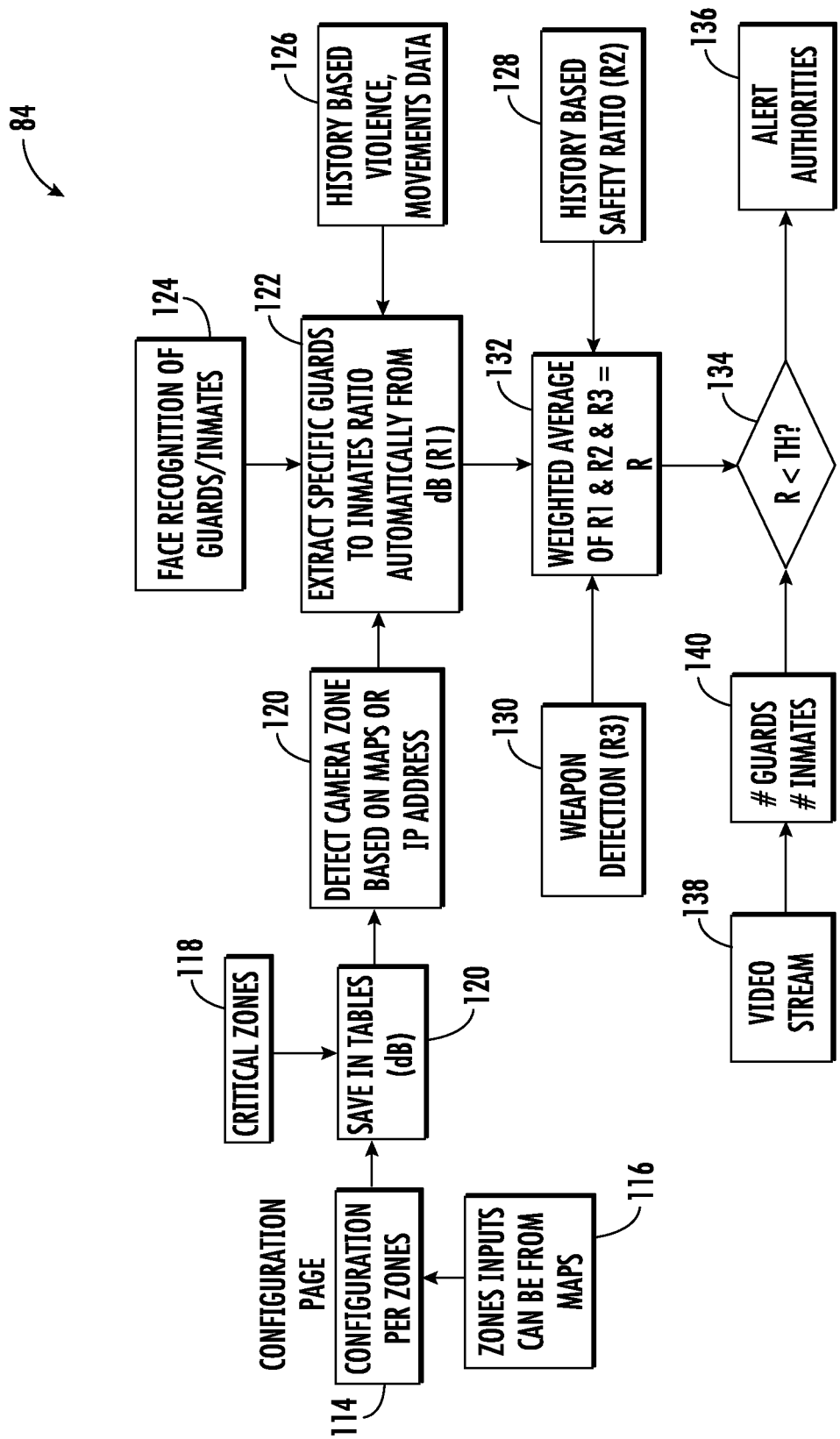
FIG. 9 is a flow diagram showing further details of a Safety Ratio Module used in the method of FIG. 7.

FIG. 9 is a flow diagram showing more details regarding the Safety Ratio module 84. The Safety Ratio module 84 begins with configuring the zones, as indicated at block 114. This may include input from maps of the facility, as indicated at block 116, as well as critical zones (or regions) are identified, as indicated at block 118. The zone configurations are saved, as indicated at block 120. Camera zones are detected, as indicated at block 120. This information is provided to a block 122, where guards to inmates ratios are extracted for each zone, and a ratio $R_1$ is determined for each zone. The block 122 also receives face recognition information from a block 124. The block 122 also receives historical information from a block 126. A block 128 provides historical safety ratio information as a ratio $R_2$. A block 130 provides information regarding weapon detection as a ratio $R_3$. A weighted average of $R_1$, $R_2$ and $R_3$ is determined at block 132. At a decision block 134, a determination is made as to whether a blended (e.g. weighted) ratio R is below a threshold. If so, control passes to block 136, where authorities are alerted. The threshold may be impacted by information from the video stream, as indicated at block 138, and by the numbers of guards and inmates, as indicated at block 140.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for improving guard safety in a corrections facility, wherein the corrections facility includes a first video surveillance camera providing a first video stream of a first region of the corrections facility and a second video surveillance camera providing a second video stream of second region of the corrections facility, the method comprising:

processing the first video stream via a video analytics engine to:

identify guards that are present in the first region of the corrections facility based at least in part on the apparel worn by the guards;

identify inmates that are present in the first region of the corrections facility based at least in part on the apparel worn by the inmates;

wherein the video analytics engine includes a facial recognition module that identifies an identity of at least one of the number of inmates that are present in the first region of the corrections facility;

determining a number of guards that are present in the first region of the corrections facility;

determining a number of inmates that are present in the first region of the corrections facility;

issuing a first alarm when a ratio (R) of the number of guards that are present in the first region of the corrections facility and the number of inmates that are present in the first region of the corrections facility falls below a first Guard Safety Ratio Threshold (GSRT) that is defined for the first region of the corrections facility, wherein the first Guard Safety Ratio Threshold (GSRT) is dependent at least in part on the identity of at least one of the number of inmates that are identified as being present in the first region of the corrections facility;

processing the second video stream via the video analytics engine to:
  identify guards that are present in the second region of the corrections facility based at least in part on the apparel worn by the guards;
  identify inmates that are present in the second region of the corrections facility based at least in part on the apparel worn by the inmates;
  wherein the video analytics engine includes a facial recognition module that identifies an identity of at least one of the number of inmates that are present in the second region of the corrections facility;

determining a number of guards that are present in the second region of the corrections facility;

determining a number of inmates that are present in the second region of the corrections facility; and issuing a second alarm when a ratio (R) of the number of guards that are present in the second region of the corrections facility and the number of inmates that are present in the second region of the corrections facility falls below a second Guard Safety Ratio Threshold (GSRT) that is defined for the second region of the correction facility, wherein the second Guard Safety Ratio Threshold (GSRT) that is defined for the second region of the corrections facility is different from the first Guard Safety Ratio Threshold (GSRT) that is defined for the first region of the corrections facility, and wherein the second Guard Safety Ratio Threshold (GSRT) is dependent at least in part on the identity of at least one of the number of inmates that are identified as being present in the second region of the corrections facility.

2. The method of claim 1, further comprising:
storing a history of violence for the region of the corrections facility; and
the Guard Safety Ratio Threshold (GSRT) is dependent at least in part on the history of violence for the region of the corrections facility.

3. The method of claim 1, wherein:
the facial recognition module identifies an identity of the particular guards that are present in the region of the corrections facility; and
the Guard Safety Ratio Threshold (GSRT) is dependent at least in part on the identity of the particular guards that are identified as being present in the region of the corrections facility.

4. The method of claim 1, wherein the video analytics engine is configured to:
determine a separation distance between each of the inmates and each of the guards that are identified as being present in the region of the corrections facility; and
issue a second alarm when the separation distance between one or more inmates and a guard falls below a Guard Safety Spacing Threshold (GSST).

5. The method of claim 1, wherein the video analytics engine is configured to:
determine a separation distance between each of the inmates that are identified as being present in the region of the corrections facility;
cluster the inmates that have a separation distance that is less than a cluster threshold distance into a respective cluster;
determine a separation distance between each respective cluster of inmates and each of the guards that are identified as being present in the region of the corrections facility; and
issue a third alarm when the separation distance between one or more of the respective clusters of inmates and a guard falls below a Guard Safety Cluster Spacing Threshold (GSCST).

6. The method of claim 1, wherein the video analytics engine is configured to:
determine a separation distance between each of the inmates that are identified as being present in the region of the corrections facility;
cluster the inmates that have a separation distance that is less than a cluster threshold distance into a respective cluster; and
issue a fourth alarm when the number of inmates in any respective cluster exceeds a Cluster Size Threshold (CST).

7. The method of claim 1, wherein issuing the first alarm comprises one or more of:
automatically displaying the video stream of the region on an operator console of the corrections facility;
activating an audible sounding device in the region;
sending a wireless message to a mobile device carried by one of the guards that are determined to be present in the region of the corrections facility;
sending a wireless message to a mobile device carried by one of the guards that are not present in the region of the corrections facility to provide support to the one or more guards that are in the region of the corrections facility; and
locking and/or unlocking one or more doors of the corrections facility.

8. A method for improving guard safety in a corrections facility, wherein the corrections facility includes a video surveillance camera providing a video stream of a region of the corrections facility, the method comprising:
storing a history of violence for the region of the corrections facility;
processing the video stream of the region via a video analytics engine to identify guards and inmates that are present in the region of the corrections facility;

determining a separation distance between each of the inmates and each of the guards that are identified as being present in the region of the corrections facility; and issuing an alarm when the separation distance between one or more of the inmates and a guard in the region falls below a Guard Safety Spacing Threshold (GSST) that is defined for the region wherein the Guard Safety Spacing Threshold (GSST) is dependent at least in part on the history of violence for the region of the corrections facility.

9. The method of claim 8, wherein the corrections facility includes another video surveillance camera providing a video stream of another region of the corrections facility, the method comprising:

processing the video stream of the region via a video analytics engine to identify guards and inmates that are present in the other region of the corrections facility;

determining a separation distance between each of the inmates and each of the guards that are identified as being present in the other region of the corrections facility; and issuing another alarm when the separation distance between one or more of the inmates and a guard in the other region falls below a Guard Safety Spacing Threshold (GSST) that is defined for the other region of the correction facility, wherein the Guard Safety Spacing Threshold (GSST) that is defined for the other region of the corrections facility is different from the Guard Safety Spacing Threshold (GSST) that is defined for the region of the corrections facility.

10. The method of claim 8, wherein:

the video analytics engine includes a facial recognition module that identifies an identify of the particular inmates that are present in the region of the corrections facility; and the Guard Safety Spacing Threshold (GSST) is dependent at least in part on the identity of the particular inmates that are identified as being present in the region of the corrections facility.

11. The method of claim 10, wherein:

the facial recognition module identifies an identity of the particular guards that are present in the region of the corrections facility; and the Guard Safety Spacing Threshold (GSST) is dependent at least in part on the identity of the particular guards that are identified as being present in the region of the corrections facility.

12. The method of claim 8, wherein the video analytics engine is configured to:

determine a separation distance between each of the inmates that are identified as being present in the region of the corrections facility;

cluster the inmates that have a separation distance between other inmates identified as being present in the region of the corrections facility that is less than a cluster threshold distance into a respective cluster;

determine a separation distance between each respective cluster of inmates and each of the guards that are identified as being present in the region of the corrections facility; and issue a second alarm when the separation distance between one or more of the respective cluster of inmates and a guard falls below a Guard Safety Cluster Spacing Threshold (GSCST).

13. The method of claim 8, wherein the video analytics engine is configured to:

determine a separation distance between each of the inmates that are identified as being present in the region of the corrections facility;

cluster the inmates that have a separation distance between other inmates identified as being present in the region of the corrections facility that is less than a cluster threshold distance into a respective cluster;

determine a separation distance between each respective cluster of inmates and each of the guards that are identified as being present in the region of the corrections facility; and issue a third alarm when the number of inmates in any respective cluster exceeds a Cluster Size Threshold (CST).

14. A non-transitory computer readable medium storing instructions that when executed by one or more processors causes the one or more processors to:

process a video stream of a region of a corrections facility using a video analytics engine to:

identify guards that are present in the region of the corrections facility;

identify an identity of the inmates that are present in the region of the corrections facility;

perform one or more of:

determining a number of guards that are present in the region of the corrections facility and a number of inmates that are present in the region of the corrections facility, and issuing a first alarm when a ratio (R) of the number of guards that are present in the region of the corrections facility and the number of inmates that are present in the region of the corrections facility falls below a Guard Safety Ratio Threshold (GSRT), wherein the Guard Safety Ratio Threshold (GSRT) is dependent at least in part on the identity of the particular inmates that are identified as being present in the region of the corrections facility; and determining a separation distance between each of the inmates and each of the guards that are identified as being present in the region of the corrections facility, and issuing a second alarm when the separation distance between one or more of the inmates and a guard falls below a Guard Safety Spacing Threshold (GSST), wherein the Guard Safety Spacing Threshold (GSST) is dependent at least in part on the identity of the particular inmates that are identified as being present in the region of the corrections facility.

15. The non-transitory computer readable medium of claim 14, wherein one or more of the Guard Safety Ratio Threshold (GSRT) and the Guard Safety Spacing Threshold (GSST) is dependent at least in part on one or more of:

a history of one or more of the Guard Safety Ratio Threshold (GSRT) and the Guard Safety Spacing Threshold (GSST) for the region of the corrections facility;

whether a weapon is currently identified by the video analytics engine in the region of the corrections facility; and a history of violence for the region of the corrections facility.

16. The non-transitory computer readable medium of claim 14, wherein the instructions when executed cause the one or more processors to use facial recognition to identify the identity of the particular inmates and/or the identity of the particular guards that are present in the region of the corrections facility.

17. The non-transitory computer readable medium of claim 14, wherein one or more of the first alarm and the second alarm comprises one or more of:
- automatically displaying the video stream of the region on an operator console of the corrections facility;
- activating an audible sounding device in the region;
- sending a wireless message to a mobile device carried by one of the guards that are determined to be present in the region of the corrections facility;
- sending a wireless message to a mobile device carried by one of the guards that are not present in the region of the corrections facility to provide support to the one or more guards that are in the region of the corrections facility; and
- locking and/or unlocking one or more doors of the corrections facility.

* * * * *